US006720908B1

(12) United States Patent
Puglia

(10) Patent No.: US 6,720,908 B1
(45) Date of Patent: Apr. 13, 2004

(54) SENSOR FRONT-END FOR RANGE AND BEARING MEASUREMENT

(75) Inventor: Kenneth V. Puglia, Westford, MA (US)

(73) Assignee: M/A-Com, Inc., Lowell, MA (US)

( * ) Notice: Subject to any disclaimer, the term of this patent is extended or adjusted under 35 U.S.C. 154(b) by 34 days.

(21) Appl. No.: 10/298,077

(22) Filed: Nov. 15, 2002

(51) Int. Cl.[7] .............................................. G01S 13/92
(52) U.S. Cl. .................... 342/70; 342/113; 342/114; 342/157; 342/194; 342/383; 342/384
(58) Field of Search ............................ 342/70, 71, 79, 342/81, 83, 113, 114, 155, 157, 194, 380–384

(56) References Cited

U.S. PATENT DOCUMENTS

| | | | | |
|---|---|---|---|---|
| 3,727,221 A | * | 4/1973 | Julier et al. .................... 342/80 |
| 4,833,481 A | * | 5/1989 | Shibano et al. ............. 342/457 |
| 6,067,040 A | * | 5/2000 | Puglia ......................... 342/134 |
| RE36,819 E | * | 8/2000 | Gellner et al. ................ 342/70 |
| 6,121,919 A | * | 9/2000 | Ameen et al. ............... 342/174 |
| 6,229,475 B1 | * | 5/2001 | Woolley ....................... 342/93 |
| 6,317,076 B1 | * | 11/2001 | Ameen et al. ............... 342/174 |
| 6,384,768 B1 | * | 5/2002 | Kai .............................. 342/70 |
| 2003/0095062 A1 | * | 5/2003 | Suzuki et al. ................. 342/70 |
| 2003/0112172 A1 | * | 6/2003 | Shinoda et al. ............... 342/70 |

FOREIGN PATENT DOCUMENTS

DE 4407369 A1 * 9/1995 ........... G01S/13/10

* cited by examiner

Primary Examiner—Thomas H. Tarcza
Assistant Examiner—Isam Alsomiri

(57) ABSTRACT

A method for measuring range and bearing of an object. At least a portion of a first signal is transmitted from a sensor. The transmitted signal is reflected from an object and received by the sensor. At least a portion of the first signal is applied a first mixer and a second mixer. The received signal is applied to the first mixer and the second mixer. A second signal is generated from the first mixer, and a third signal is generated from the second mixer when the portion of the first signal that was transmitted overlaps the reflected signal at least partially. Bearing angle, degree on or off boresight and object range may be determined from the second and third signals, or a combination thereof. Also disclosed is a sensor for object range and bearing measurement.

44 Claims, 13 Drawing Sheets

MODULAR PULSE

TX-PULSE

LO-PULSE

RX-PULSE

MIXER OUTPUT

SENSOR FRONT-END FOR RANGE AND BEARING MEASUREMENT

FIELD OF THE INVENTION

The invention relates to object range and bearing sensors.

BACKGROUND OF THE INVENTION

Object range and bearing sensors are useful in numerous applications. These sensors are increasingly being implemented in automotive applications, for example to provide warnings of potential collisions with objects, including pedestrians or other vehicles.

Creating sensors that can reliably discriminate between potentially hazardous objects and objects posing no risk has been a significant challenge. Object discrimination improves as object location and velocity is further delineated. As object discrimination improves, false alarms decrease. Sensor size is also an important design consideration for many applications, particularly for automotive uses.

Conventional range and bearing determination uses lobe switching. Lobe switching is the steering of an antenna beam to scan an area. The maximum radiation or reception is sequentially switched to each of two or more directions. It is analogous to illuminating a volume of space by scanning it with a flashlight wherein only portions of the space are illuminated at any one time. Lobe switching may be accomplished mechanically or electronically. The range data is obtained by measuring the time delay. The bearing measurement is accomplished by encoding the position of the antenna, i.e., the illumination angle or lobe, and recording the object data for that angle.

Lobe switching is used to obtain bearing information when a particular bearing angle is under observation. Generally, several lobes with narrow beams are required to obtain good resolution. Resolution is increased by increasing the number of lobes scanned. The data is recorded sequentially as each lobe is scanned. This requires significant time and data memory.

Designing a small, reliable sensor capable of accurately discriminating between objects and using a minimal amount of data memory, continues to be a goal of engineers.

SUMMARY OF THE INVENTION

Embodiments of the invention include methods for measuring range and bearing of an object. In an illustrative embodiment, at least a portion of a first signal is transmitted from a sensor. The transmitted signal is reflected from an object and received by the sensor. At least a portion of the first signal is applied a first mixer and a second mixer. The received signal is applied to the first mixer and the second mixer. A second signal is generated from the first mixer, and a third signal is generated from the second mixer when the portion of the first signal that was transmitted overlaps the reflected signal at least partially. One or more of the following actions may then be performed, 1) measuring an amplitude difference between the second signal and the third signal, and determining the bearing angle based on the measured amplitude difference; 2) determining an object range based on the time delay of the second signal output; and 3) measuring a phase difference between the second signal and the third signal, and determining whether the object is to the right or left of boresight based on the measured phase difference.

The invention further includes a sensor for object range and bearing measurement. An illustrative sensor includes a first mixer to mix at least a portion of a first signal with a received signal and a second mixer to mix at least a portion of the first signal with the received signal. At least a portion of the first signal is applied to the first mixer and the second mixer, and the received signal is applied to the first mixer and the second, mixer. SIgnals may be generated from the first mixer and the second mixer when a portion of the first signal at least partially overlaps the received signal. The actions listed in the preceding paragraph may then be performed using the signals generated from the mixers.

DESCRIPTION OF THE DRAWINGS

The invention is best understood from the following detailed description when read with the accompanying drawings.

DETAILED DESCRIPTION OF THE INVENTION

Embodiments of the invention include a sensor front-end architecture that can be used for the measurement of object range, bearing or both. The architecture uses pulsed sensor technology. The measurement of bearing can be accomplished using common aperture antennas and monopulse techniques. The monopulse system acquires bearing information with high resolution by a simple amplitude comparison of signals received simultaneously as opposed to using lobe switching techniques. By using monopulse techniques, less time and data memory are needed as compared to systems using lobe switching.

In an exemplary embodiment of the sensor architecture, a segment of a radio frequency (RF) pulse is used for a transmitter signal while another segment of the RF pulse is used as a local oscillator pulse. The segmentation of the developed RF pulse can be accomplished with a switching assembly such as an arrangement of single-pole, dual-throw (SPDT) switches.

Following is a brief description of a conventional monopulse technique utilized in radar systems for the measurement of object bearing angle and which may be applied to embodiments of the sensor architecture disclosed.

Typical antenna pattern parameters are first examined for antennas operating in conjunction with a 180° hybrid.

Figure 1:
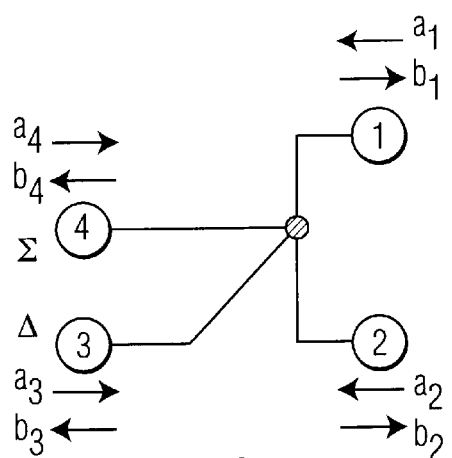
FIG. 1 depicts a 180° hybrid junction.

A 180° hybrid is shown schematically in FIG. 1. The device is passive and reciprocal and allows either equal amplitude and phase power division when the Σ port 4 is the input or equal amplitude and opposite phase power division when the Δ port 3 is the input.

The incident, $a_n$, and reflected, $b_n$, waves at each port of the 180° hybrid may be used to write the S-Parameter matrix and thereby gain a better understanding of the device's properties and the operation within the proposed equipment.

$$\begin{bmatrix} b_1 \\ b_2 \\ b_3 \\ b_4 \end{bmatrix} = \begin{bmatrix} 0 & 0 & 1/\sqrt{2} & 1/\sqrt{2} \\ 0 & 0 & -1/\sqrt{2} & 1/\sqrt{2} \\ 1/\sqrt{2} & -1/\sqrt{2} & 0 & 0 \\ 1/\sqrt{2} & 1/\sqrt{2} & 0 & 0 \end{bmatrix} \cdot \begin{bmatrix} a_1 \\ a_2 \\ a_3 \\ a_4 \end{bmatrix}$$

The S-parameter matrix may be used to calculate both the transmission characteristics, i.e., where port 4, Σ, and port 3, Δ, are the inputs, or the reception characteristics, i.e., where ports 1 and 2 are the inputs.

First, the transmission characteristics when the hybrid is excited at port 4 with signal of magnitude one ($a_4$=1.0) are calculated.

$$b_1 = 1/\sqrt{2} + 1/\sqrt{2} = 2/\sqrt{2}$$

In the receive mode, with an object which is on boresight, equal amplitude and phase signals will be applied at ports 1 and 2. For purposes of the calculation of the resulting signals at ports 3 ands 4, it is assumed that $a_1=a_2=1.0$ and $a_3=a_4=0$.

$$b_3 = 1/\sqrt{2} - 1/\sqrt{2} = 0$$
$$b_4 = 1/\sqrt{2} + 1/\sqrt{2} = 2/\sqrt{2}$$

Therefore, for an on-boresight object, all the received signal energy is available at port 4 and a null appears at port 3.

Figure 2:
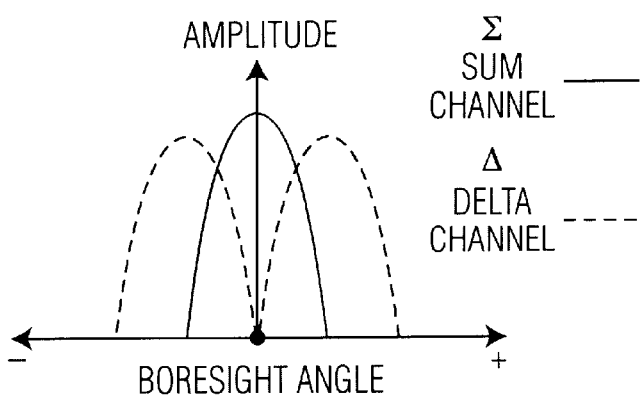
FIG. 2 depicts effective antenna patterns.

For off-boresight objects, equal amplitude signals are incident at ports 1 and 2, however, the phase of the return signals at ports 1 and 2 is either phase advanced or phase retarded depending upon whether the object is closer to port 1 or closer to port 2. The effective antenna beamwidth for each channel is illustrated in FIG. 2.

Figure 3:
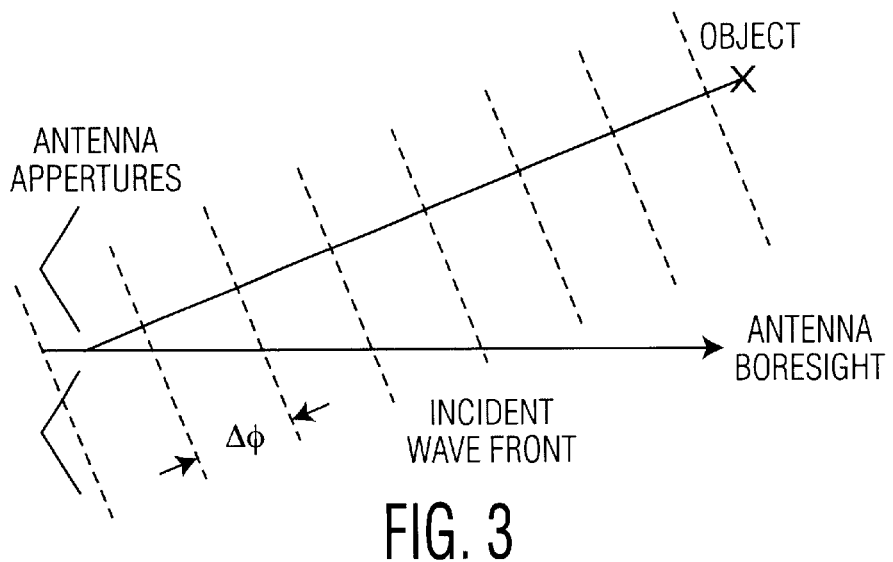
FIG. 3 depicts the phase difference resulting from off-boresight objects.

A greater physical understanding of the phase difference resulting from off-boresight objects may be gained from FIG. 3 where a wavefront from an off-boresight object is incident on the antenna apertures which are connected to ports 1 and 2. The phase difference of the signals incident on the antenna apertures that results from the additional time delay associated with the longer range to the object is indicated by Δϕ.

Processing of both the amplitude and phase of the Δ-channel signal with respect to the Σ-channel signal will yield the object bearing information.

Figure 4:
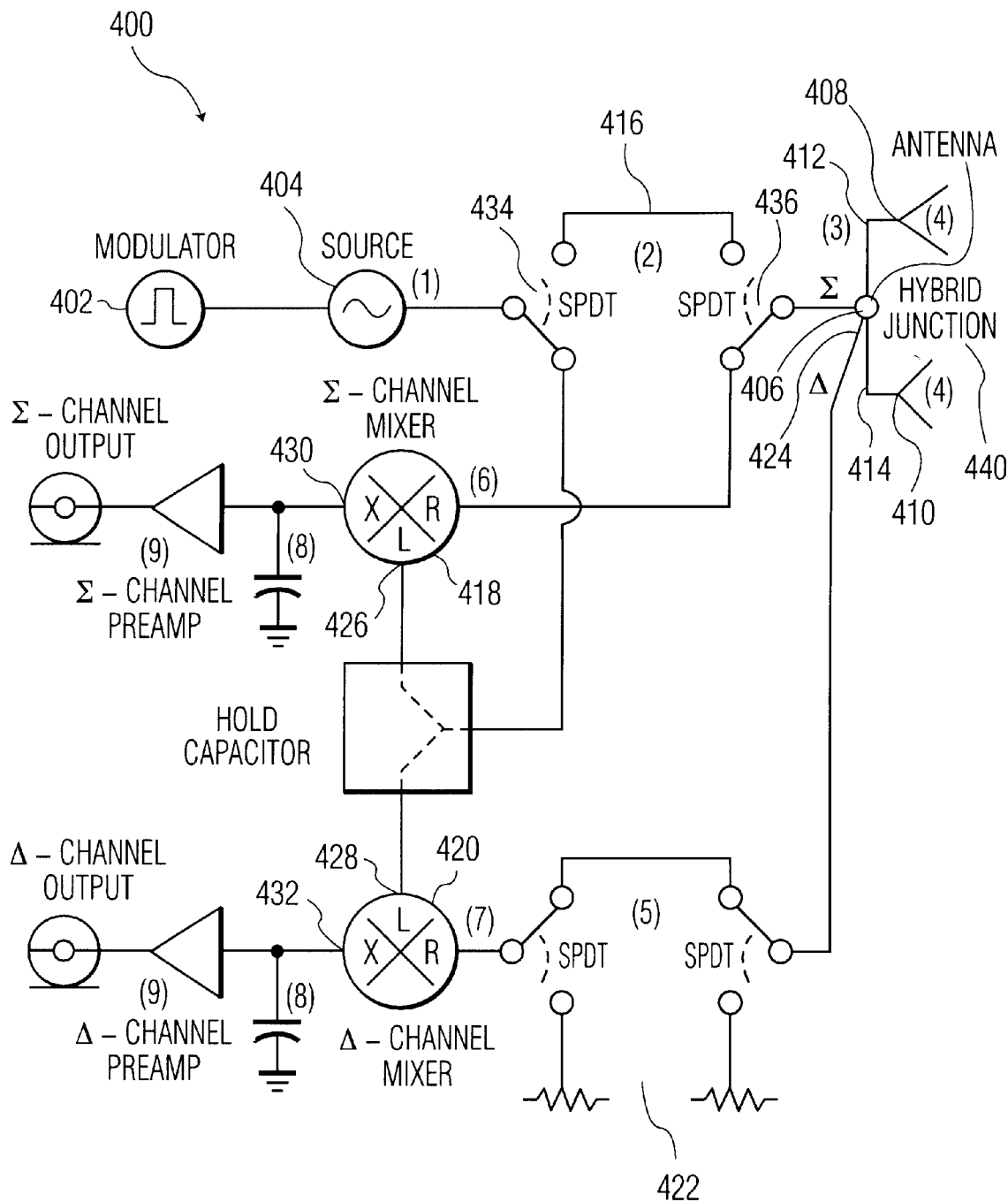
FIG. 4 depicts a sensor front-end architecture according to an illustrative embodiment of the invention.
Figure 5A:
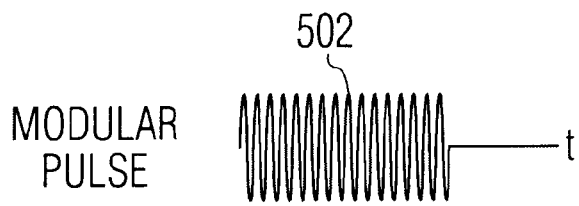
FIGS. 5a–e depicts an operational timing diagram associated with the embodiment in FIG. 4.
Figure 5B:
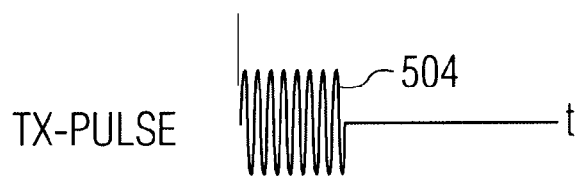
Figure 5C:
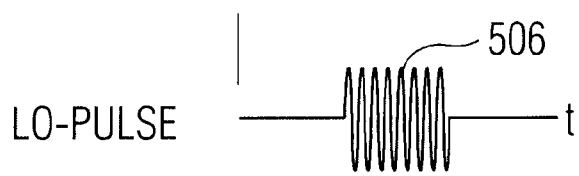
Figure 5D:
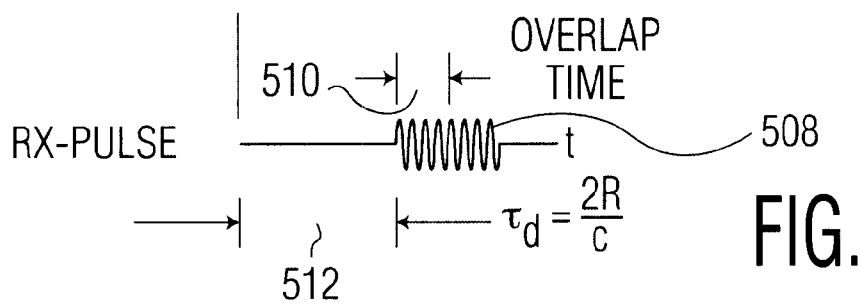
Figure 5E:
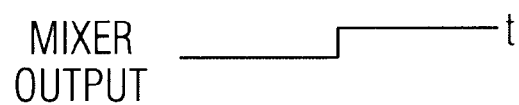

FIG. 4 depicts a pulsed sensor front-end architecture 400 according to an illustrative embodiment of the invention. Modulator 402 inputs a succession of pulses to source 404. A pulse is produced at source 404, preferably in the RF range, and input to a first switch assembly 416. When first switch assembly 416 is in a transmit position, a first segment of the RF pulse is applied to a hybrid junction 406 of antenna assembly 440. Antenna assembly 440 includes hybrid junction 406 which is connected to antennas 408 and 410, which in turn are connected to co-linear arms 412 and 414, respectively. Antenna assembly 440 is merely an illustrative assembly. Other configurations can be used within the scope of the invention. Antennas 408 and 410 can serve as either transmit or receive antennas, depending on switch positions. In the transmit position, the first pulse segment is transmitted from the antennas.

When first switch assembly 416 is in a receive position (as shown), a second segment of the RF pulse is applied to Σ-mixer 418 and Δ-mixer 420 simultaneously. If the first pulse segment has been reflected from an object, the antennas receive the signal. The reflected first pulse segment is also applied to Σ-mixer 418 and Δ-mixer 420 when the switches are in the receive position.

A second switch assembly 422 is connected to Δ-mixer 420 and a Δ-port 424 of hybrid junction 406. Second switch assembly 422 switches between a first position in which the reflected first pulse segment is input to Δ-mixer 420, and a second position in which it is not. This may increase the signal isolation in the Δ-channel.

The sensor may operate as follows: switch assembly 416 is actuated such that a first segment of the RF pulse is transmitted for a specified period of time, the transmit time, and then a second segment of the RF pulse is applied to local oscillator ports 426 and 428 of Σ-mixer 418 and Δ-mixer 420, respectively, during the receive time. An object within the antenna beamwidth reflects a portion of the transmitted signal energy back to sensor front-end 400. If the object range is commensurate in time with the receive time period, i.e., if the reflected transmitter pulse at least partially overlaps the receive period, a video level is produced at Σ-mixer output 430 and Δ-mixer output 432. The video level at Σ-mixer output 430 is proportional to the object range and radar cross-section, the antenna gain, the Σ-channel mixer conversion loss and the phase of the signal with respect to the applied local oscillator signal. The video level at Δ-mixer output 432 is proportional to all the factors identified with Σ-mixer output 430 in addition to the bearing angle of the object with respect to the antenna boresight angle. Range scanning may be accomplished via dynamic variation of the pulse width.

FIG. 5 shows an operational timing diagram associated with the sensor depicted in FIG. 4. A modulated pulse 502 from oscillator 404 is shown on the top line. Modulated pulse 502 is segmented in time by first switch assembly 416, applied to hybrid junction 406, and subsequently transmitted by antennas 408 and 410. A transmitted pulse segment 504 is designated as "Tx-Pulse." At the end of the transmit period, switches 434 and 436, are returned to their original positions and the remaining pulse segment 506, the local oscillator (LO) pulse, is applied to Σ-mixer 418 and Δ-mixer 420, simultaneously. Pulse segment 506 is designated as "LO-Pulse." Pulse 508 is a received pulse as reflected from an object and is designated as "Rx-Pulse." Received pulse 508 is delayed by the time of travel, $\tau_d$, to the object at range, R, and back, or, $$\tau_d = \frac{2R}{c}$$

as shown by 512, where c is the speed of light. As the pulse width is dynamically modulated, a video pulse is produced at Σ-mixer output 430 and Δ-mixer output 432 as the received and local oscillator pulses become time coincident or overlap as shown by 510. This is represented as the "mixer output" 514.

Time segmenting or gating of the modulated RF pulse between Tx and LO pulses may be utilized to determine the object range. For example, accurate control of the modulated RF pulse width, as well as the time ratio of Tx and LO pulses, may be used to form a range discriminator. No object detection occurs until the modulated pulse width is greater than the delay associated with the object range.

For the condition where relative motion exists between the sensor and object, a Doppler signal is generated at the Σ-mixer and the Δ-mixer outputs.

In-phase and Quadrature-phase signal components may be generated by the inclusion of a phase-shift element in the transmitter path that alternately changes the transmission phase of a number of transmitter pulses.

Switch assembly 416 enables a single antenna aperture for both transmit and receive. The operation and function within the inventive architecture, however, is more complex than other components that provide these functions, such as duplexers. For example, a second set of SPDT switches may be advantageous to increase the signal isolation in the Δ-channel. Furthermore, the time duration of the transmitted pulse is unique to the short-range measurement capability of the sensor front-end.

The object boresight angle may be determined via measurement of the difference in signal level of the Σ-channel and Δ-channel as described above. This technique is referred to as an amplitude monopulse system. Object position to the left or right of boresight may be determined via resolution of the Δ/Σ phase of the Doppler signals at the front-end output. In summary, the change of object range and object position with respect to boresight angle may be determined by the measurement of the monopulse ratio parameter. The required signal components may be recovered using a sampling phase detector.

Figure 6:
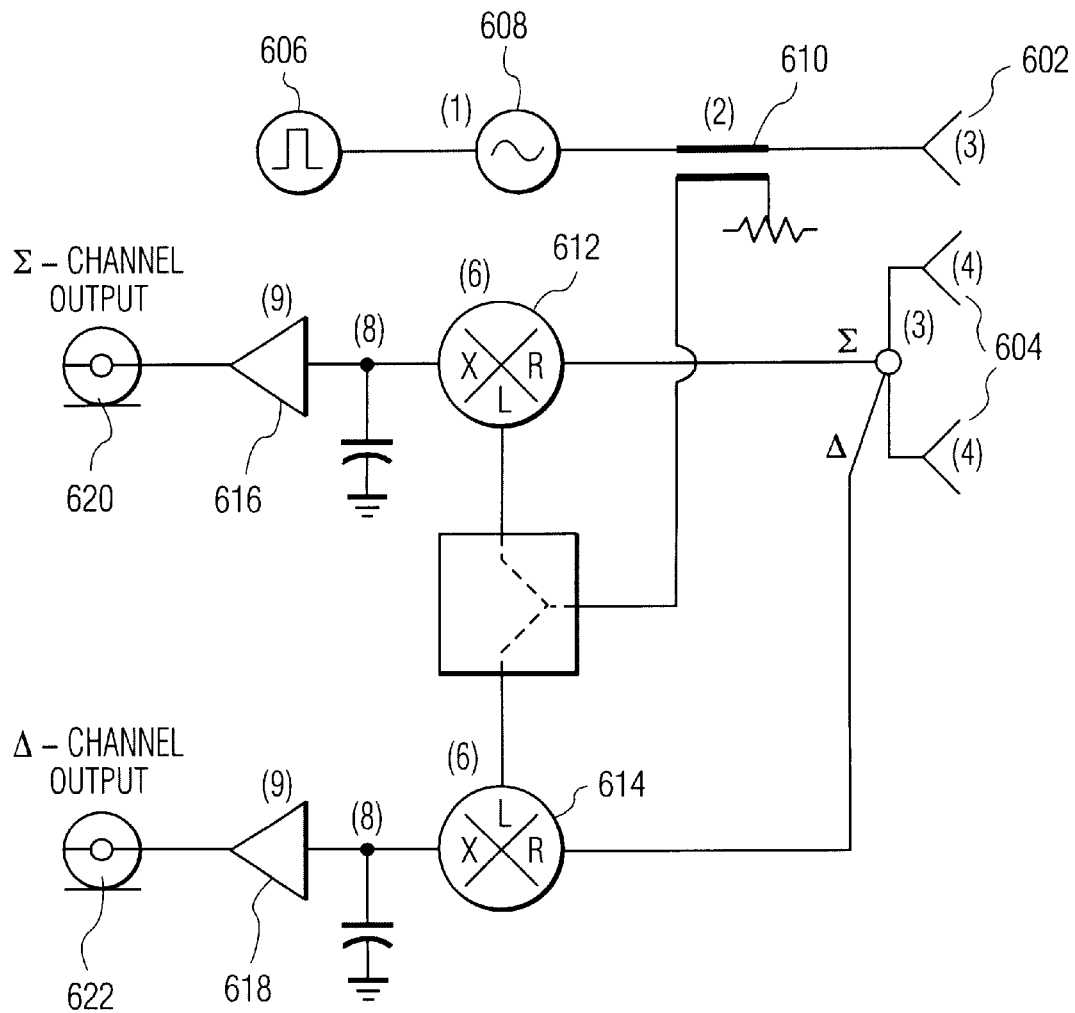
FIG. 6 depicts a sensor front-end architecture according to a further illustrative embodiment of the invention.
Figure 7A:
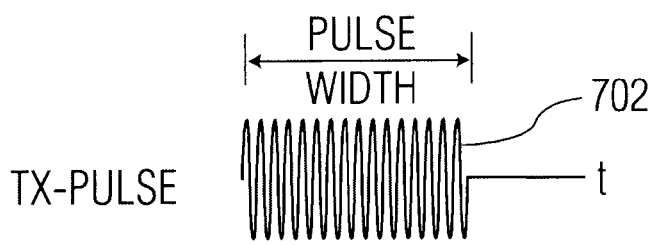
FIGS. 7a–d depicts a timing diagram associated with the embodiment shown in FIG. 6.
Figure 7B:
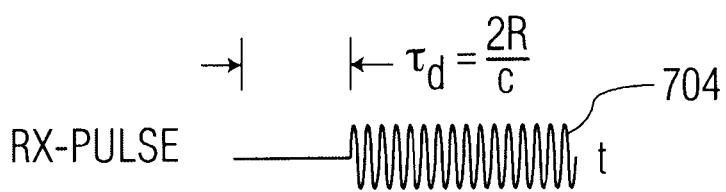
Figure 7C:
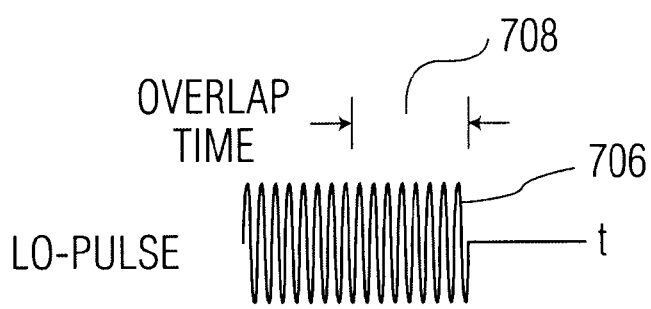
Figure 7D:
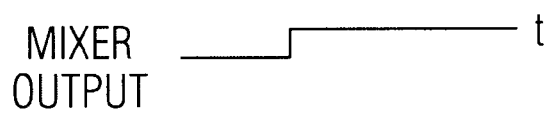

FIG. 6 depicts a pulsed sensor front-end architecture according to a further illustrative embodiment of the invention. Separate transmit and receive antennas 602 and 604, respectively, are employed. Therefore, no switching is required. Modulator 606 modulates a signal generated by oscillator 608. Coupler 610 receives a pulse from oscillator 608 and transmits it to transmit antenna 602 and also to Σ-mixer 612 and Δ-mixer 614. Receive antennas 604 receive the transmitted pulse once it is reflected from an object. Receive antennas 604 output the pulse to Σ-mixer 612 and Δ-mixer 614. Outputs of Σ-mixer 612 and Δ-mixer 614 are input to pre-amps 616 and 618, respectively. A Σ-channel pulse is output at 620, and a Δ-channel pulse is output at 622. Object range is again determined by pulse width. The pulse width also provides the ability to exclude object detection beyond a specified range.

Object bearing is determined by amplitude comparison of the Σ-channel and Δ-channel pulses at the respective outputs 620 and 622. Objects to the right or left of boresight may be determined by the phase of the Doppler signals.

FIG. 7 depicts the timing diagram associated with the embodiment shown in FIG. 6. A modulated pulse 702 is generated from oscillator 608 and is transmitted. Modulated pulse 702 is designated as "Rx-Pulse." Received pulse 704 is the modulated pulse 702 reflected from an object. Received pulse 704 is designated as "Rx-Pulse." Received pulse 704 is delayed by $$\tau_d = \frac{2R}{c}.$$

Transmitted pulse 702 is the same as pulse 706 applied to mixers 612 and 614. Pulse 706 is designated as "LO-Pulse." The overlap time 708 is the overlap time of received pulse 704 and the pulse 706 applied to the mixers.

Figure 8A:
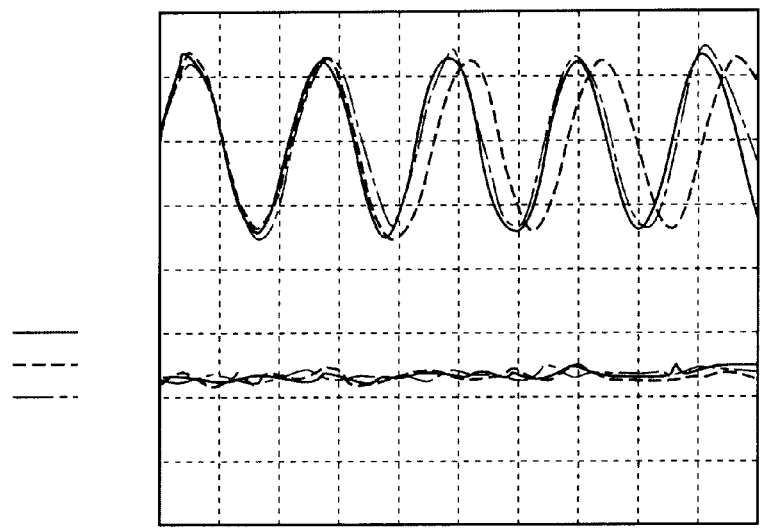
FIGS. 8a–b depict validation test results of the front-end architecture depicted in FIG. 6.
Figure 8B:
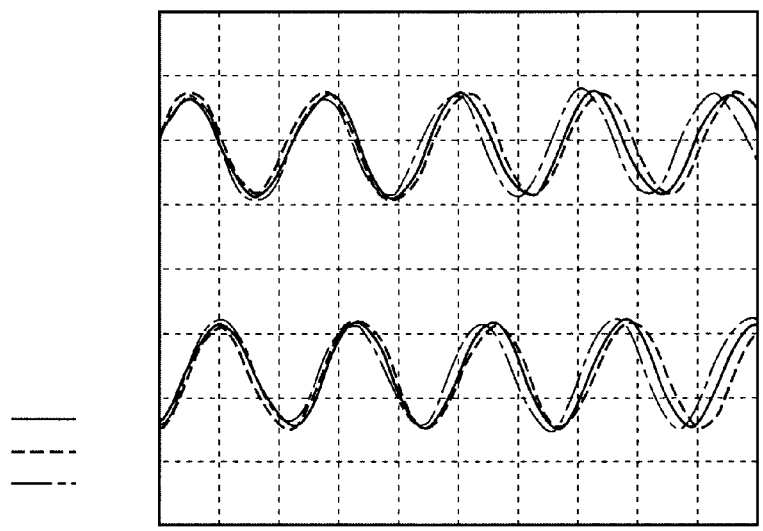

FIGS. 8*a*–*b* show validation test results of the front-end architecture depicted in FIG. 6. The results were obtained using a stationary and moving object test track at a range between 20 and 25 meters. The results illustrated in FIGS. 8*a*–*b* are for a large object at two bearing conditions. The data discloses that both range and bearing information may be obtained from the proposed sensor architecture. FIGS. 8*a*–*b* each show a Σ-channel wave and a Δ-channel wave. The wave pattern in FIG. 8*a* corresponds to an on-boresight object wherein the Δ-channel wave is flat. FIG. 8*b* shows a 90° phase difference between the Σ-channel wave and the Δ-channel wave which corresponds to an off-boresight object, which in this case is 6° off-boresight.

Figure 9:
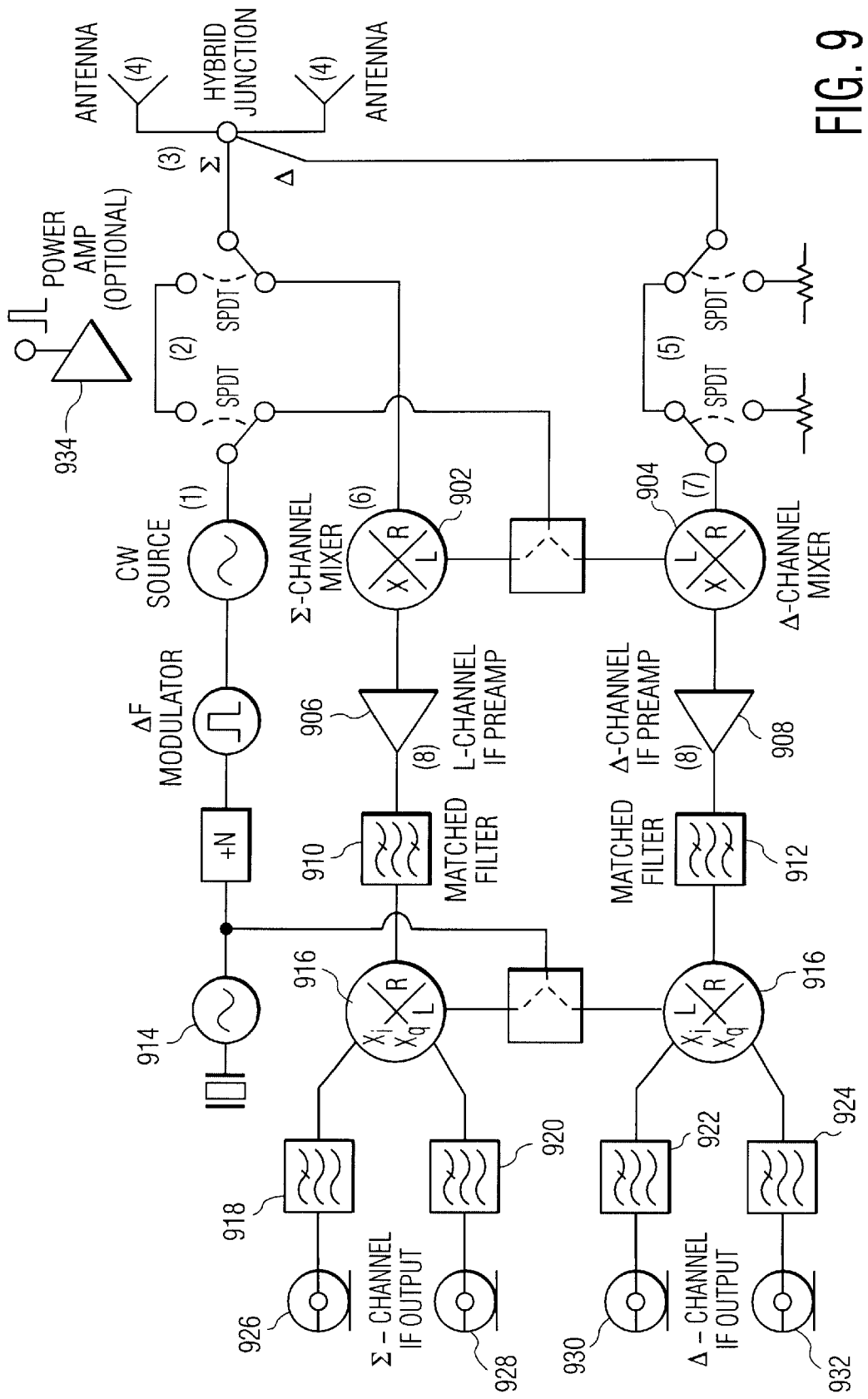
FIG. 9 depicts a sensor front-end architecture according to a further illustrative embodiment of the invention.

FIG. 9 depicts a pulsed sensor front-end architecture 900 according to a further illustrative embodiment of the invention. Sensor 900 duplicates the components of sensor 400 with the following additions. The front-end attributes include gain and phase matched channels and 'I' and 'Q' video signal elements on both channels. Preferably the sensor has a precise change in frequency during the transmitter period in order to create an intermediate frequency signal for further processing. Accordingly, outputs from Σ-mixer 902 and Δ-mixer 904 are amplified by Σ-channel IF preamp 906 and Δ-channel IF preamp 908, respectively. Matched filters 910 and 912 filter outputs from Σ-channel IF preamp 906 and Δ-channel IF preamp 908, respectively. Outputs of matched filters 910 and 912 are mixed with a signal from oscillator 914 at mixers 916 and 918. Mixer 916 provides an in-phase output 926 and a quadrature-phase output 928. These Σ-channel outputs are filtered by filters 918 and 920, respectively. Mixer 914 provides an in-phase output 930 and a quadrature-phase output 932. These Δ-channel outputs are filtered by filters 922 and 924, respectively. The video output channels at 926, 928, 930 and 932 generate information from which object range and bearing may be determined. For simultaneous processing of the Δ-channel and Σ-channel, the gain and phase of each channel are preferably matched or otherwise compensated in order to reduce or remove the potential for error within the bearing measurement. Accordingly, matched filters 910 and 912 can be implemented. Optional amplifier 934 may be incorporated to amplify the power of a transmitted pulse, to potentially achieve greater range performance.

Figure 10:
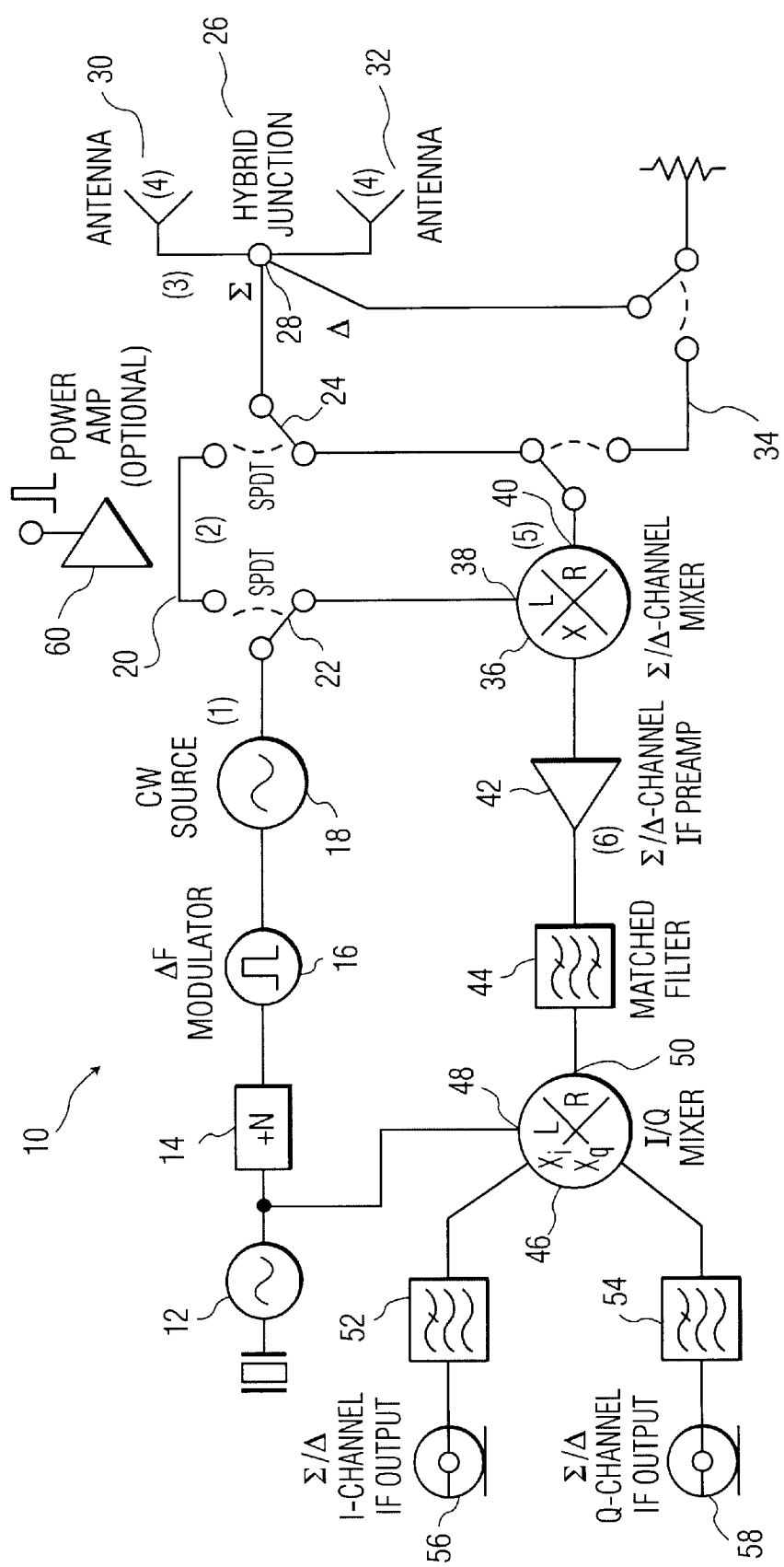
FIG. 10 depicts a sensor front-end architecture according to a further illustrative embodiment of the invention.

FIG. 10 depicts a sensor according to a further embodiment of the invention. In this embodiment, a single channel is time-shared for both Δ-channel and Σ-channel processing. This architecture is intrinsically gain and phase matched, however, the data from each channel may not be available for simultaneous acquisition.

Oscillator 12 generates a continuous wave (CW) signal and transmits it to I/Q mixer 46 and frequency divider 14. Frequency divider 14 triggers outputs to a pulse modulator 16. Frequency modulator 16 steps the frequency of CW source 18. Substantially simultaneously, switches 22 and 24 move to a transmit position and apply a transmit signal to hybrid junction 28 at its Σ-port. At the conclusion of the transmit pulse, cw source 18 returns to the original frequency and switches 22 and 24 return to their original positions. This modulated pulse is input to Σ/Δ-mixer 36 at port 38 and to antenna assembly 26 which transmits the pulse. The modulated pulse is only transmitted when switch assembly 20 is in the transmit position. The transmitted pulse may optionally be amplified by power amplifier 60. Switch assembly 20 may include switches 22 and 24. As pictured in FIG. 10, switch assembly 20 is in a receive position. The transmitted pulse is reflected by an object and received by antenna assembly 26. Antenna assembly 26 is an illustrative assembly and includes antennas 30 and 32 and hybrid junction 28.

In the receive mode, a pulse received by antenna assembly 26 is input to Σ/Δ-mixer 36 at port 40. A second switching assembly 34 is provided to increase the signal isolation of the Σ/Δ-channel.

Σ/Δ-mixer 36 outputs an IF pulse to a Σ/Δ-channel IF preamplifier 42. An IF pulse from preamplifier 42 passes through a matched filter 44 before being input to I/Q-mixer 46 at port 50. I/Q-mixer 46 provides a Σ/Δ-I-channel output at 56 and a Σ/Δ-Q-channel output at 58. These outputs are filtered by filters 52 and 54.

Figure 11:
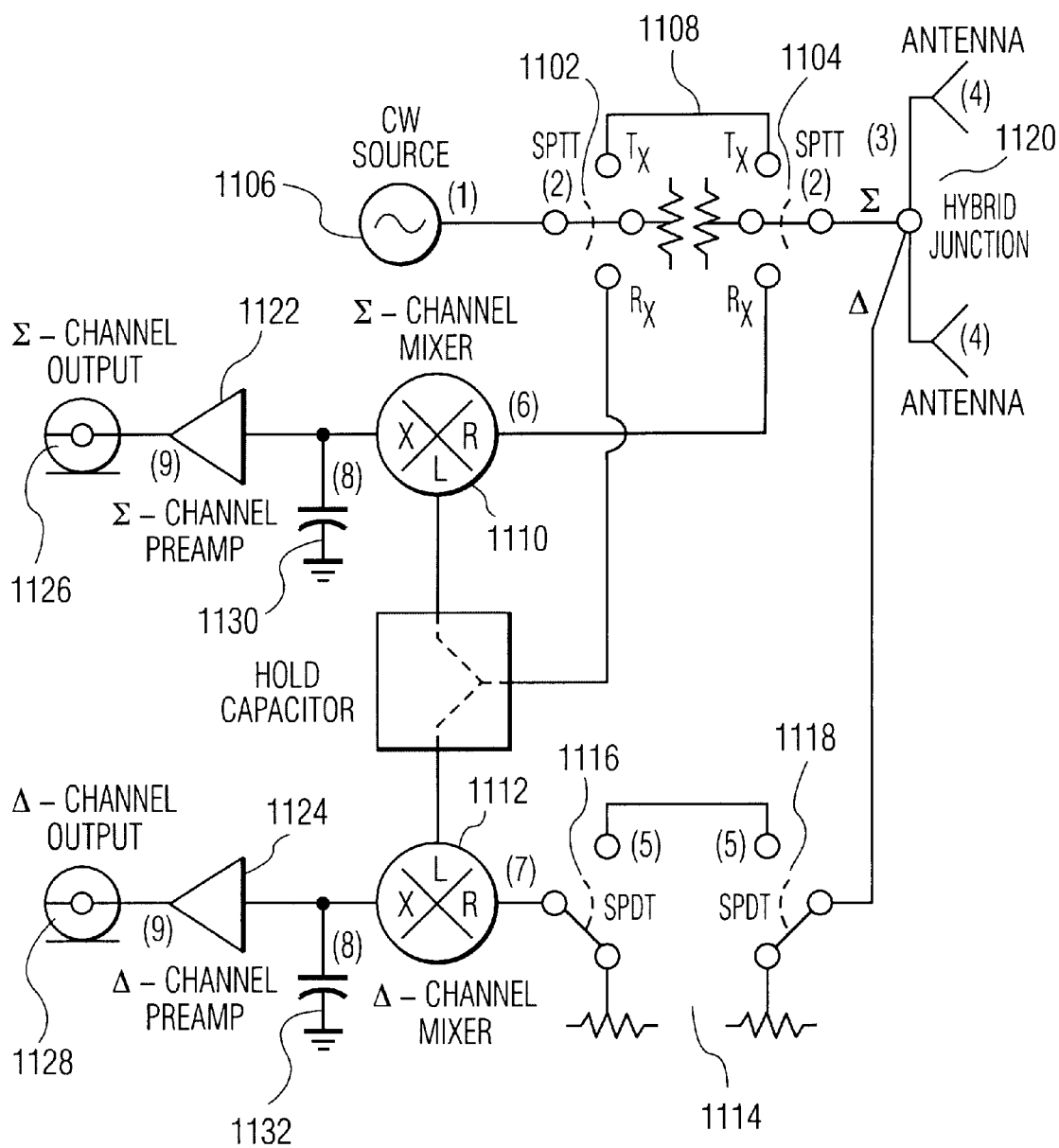
FIG. 11 depicts a swept range sensor according to an illustrative embodiment of the invention.

Another architectural embodiment that allows swept range operation is illustrated in FIG. 11. The component configuration is similar to that of FIG. 4, however, SPDT switches 416 shown in FIG. 4 are replaced with single pole triple throw (SPTT) switches 1102 and 1104, and the pulse source 404 is replaced with a CW source 1106. Switch assembly 1108 effectively segments CW signal source 1106 to generate transmit and local oscillator pulses. Pulse modulation of the primary source may not be necessary because the center positions of SPTT switches 1102 and 1104 can perform the modulation function. In addition, transmit and receive pulse width modulation may be implemented with these same switches Switch 1102 causes at least a portion of the local oscillator pulse to be input to Σ-channel mixer 1110 and Δ-channel mixer 1112, substantially simultaneously. Switch assembly 1114 may be included to increase signal isolation to the Δ-channel. Switch assembly 1114 preferably includes two SPDT switches 1116 and 1118. Outputs of mixers 1110 and 1112 are input to preamps 1122 and 1124, respectively. A Σ-channel signal is output at 1126 and a Δ-channel signal is output at 1128. Preferably the sensor includes hold capacitors 1130 and 1132.

Figure 12:
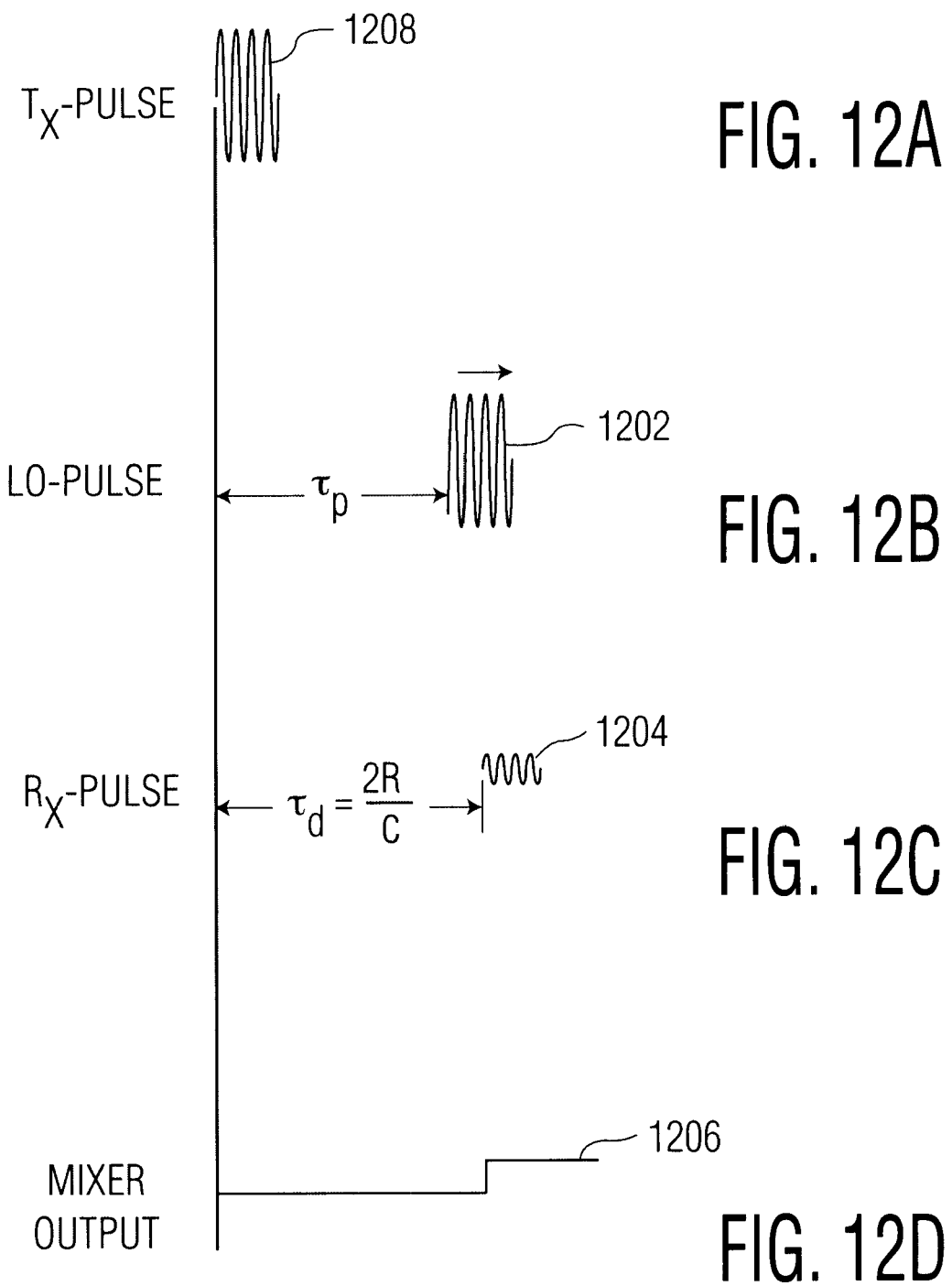
FIGS. 12a–d depicts a timing diagram associated with the embodiment shown in FIG. 11.

The timing diagram of FIG. 12 describes the operation of the swept range sensor architecture depicted in FIG. 11. Transmit pulse 1208 is transmitted through antenna assembly 1120 when SPTT switches 1102 and 1104 are in a transmit position. A local oscillator pulse 1202 is applied in accordance with a variable (swept) time, $\tau_v$, that at some point is commensurate with a receive pulse 1204 associated with the two-way time-of-travel to the object. ("Commensurate" means at least partially overlapping.) The mixer output 1206 is high beginning at the point where local oscillator pulse 1202 is commensurate with receive pulse 1204. A range dwell mode of operation is engendered by maintenance of a constant delay of the local oscillator pulse. In illustrative embodiments, in-phase and quadrature-phase signal components are implemented in one of two ways: 1) a 90° phase shifter may be added to the transmit arm, or 2) I/Q mixers may be substituted for the single-channel mixers in FIG. 11.

As with other architectures, object bearing information can be obtained by comparison of the Δ-channel amplitude with respect to the Σ-channel amplitude.

Figure 13:
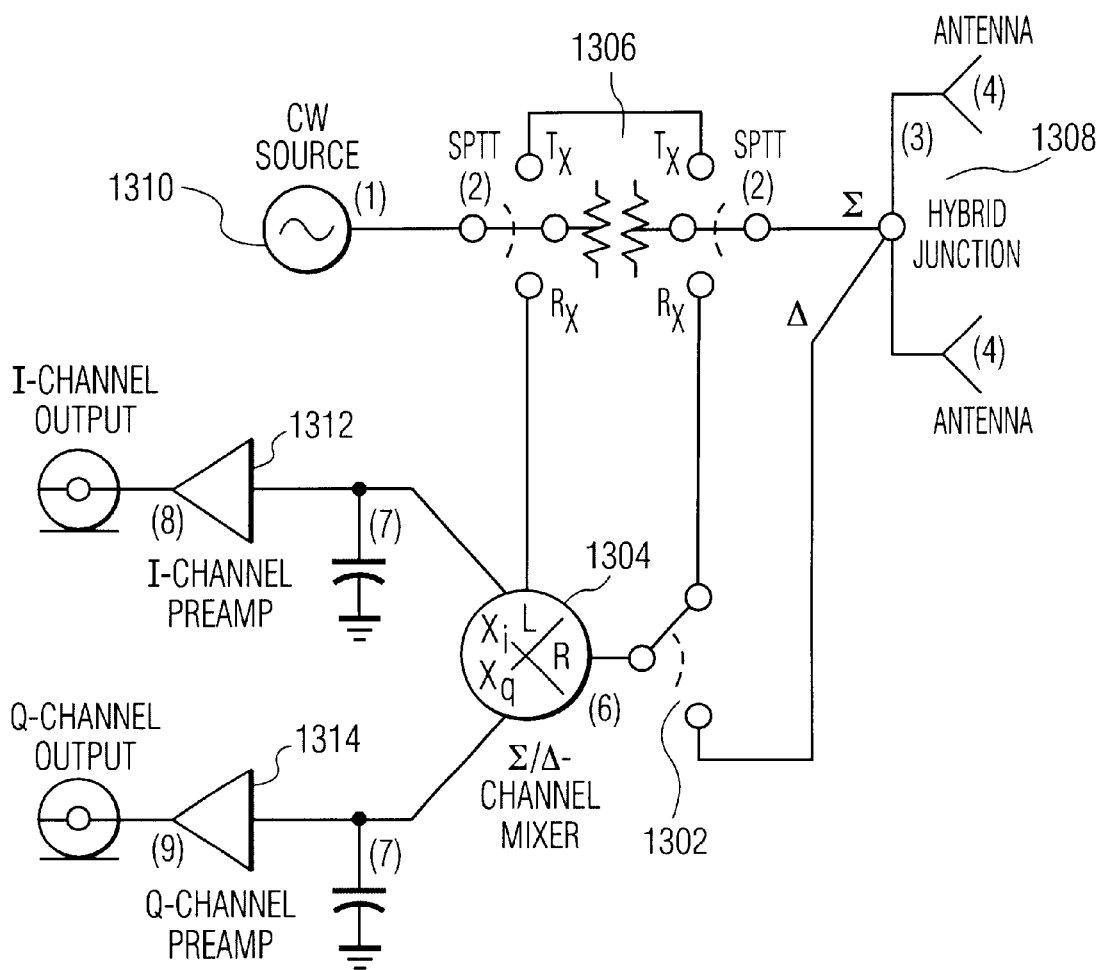
FIG. 13 depicts a single-channel swept range sensor according to an illustrative embodiment of the invention.

An illustrative embodiment of a single channel, swept range sensor architecture is depicted in FIG. 13 where the Δ-channel and Σ-channel are time-shared using an SPDT switch 1302 and an I/Q mixer 1304 to provide complex signal components. The remaining architecture shown in FIG. 13 is similar to that which is depicted in FIG. 11, having a CW Source 1304, switch assembly 1306 and antenna assembly 1308. Mixer 1304 has a first output, to I-channel preamp 1312 and a second output to Q-channel preamp 1314. Hold capacitors 1316 and 1318 can also be included.

Switches are preferably GaAs PIN diode switches. Exemplary switch circuit topologies are illustrated in FIGS. 14a–b and 15.

Figure 14A:
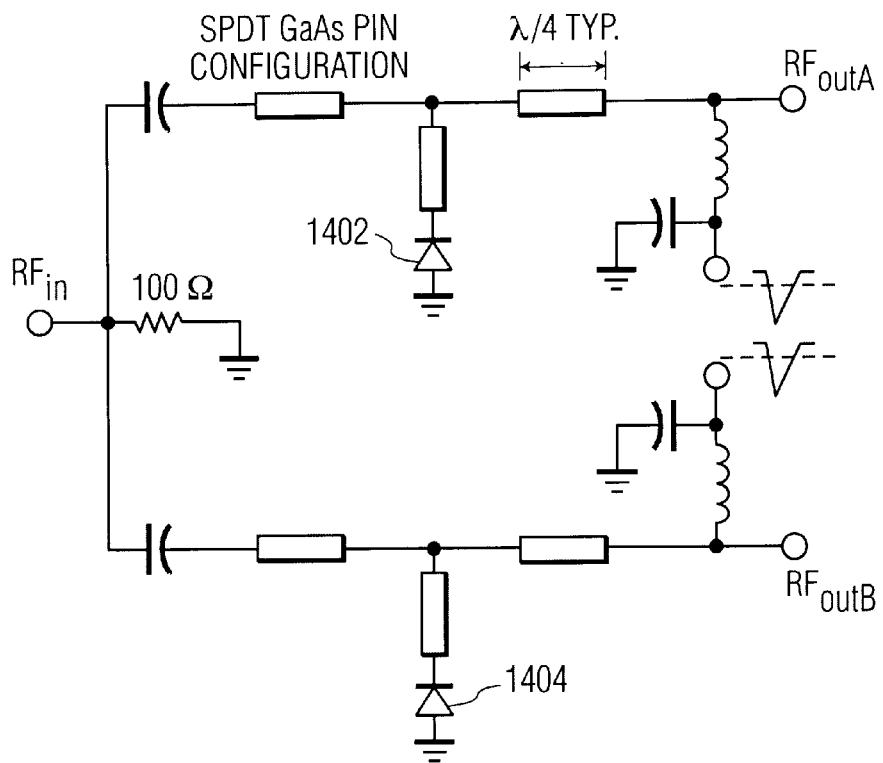
FIGS. 14a–b depict SPDT switches according to an illustrative embodiment of the invention.
Figure 14B:
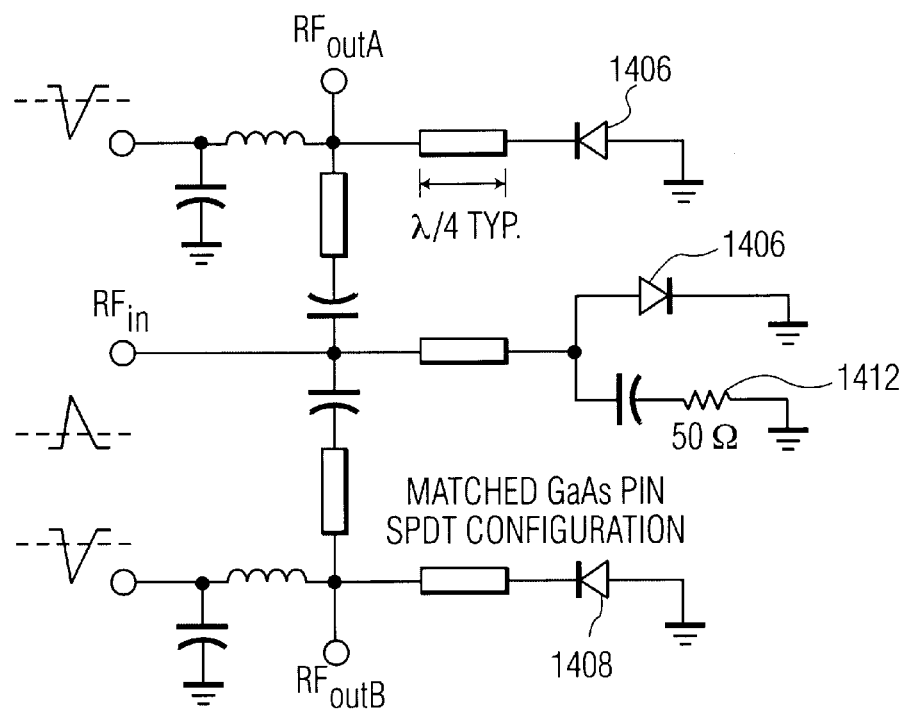
Figure 15:
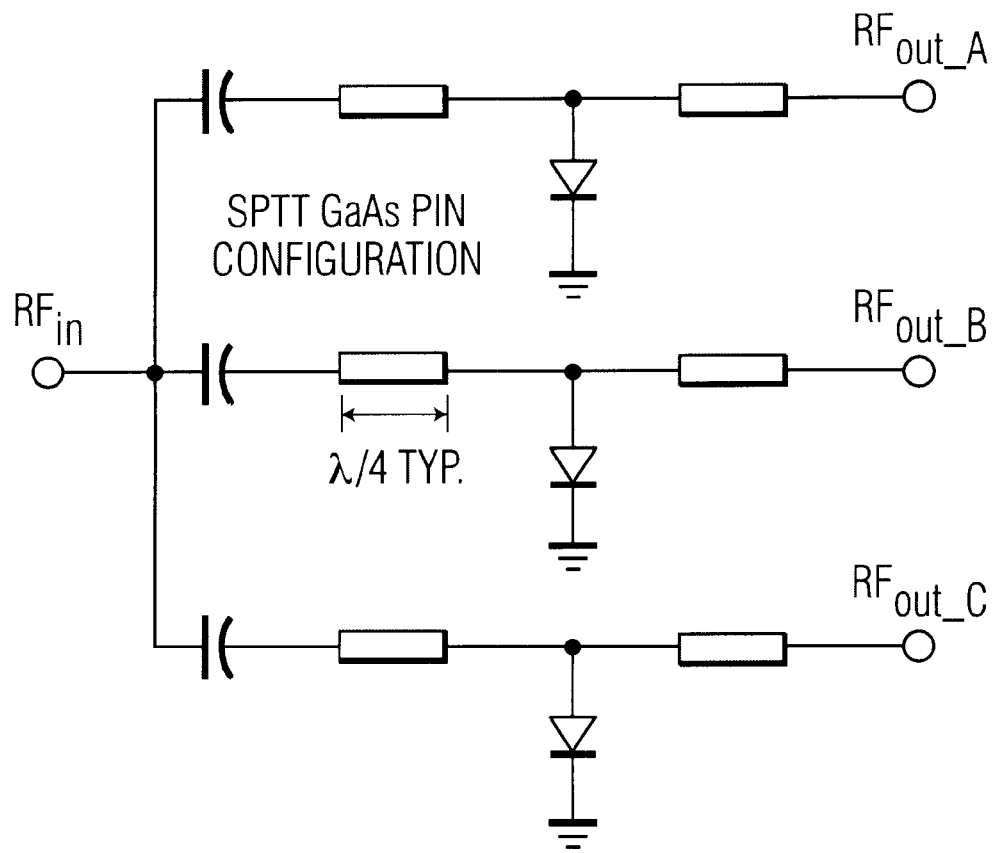
FIG. 15 depicts an SPTT switch according to an illustrative embodiment of the invention.

FIGS. 14a–b depict two illustrative embodiments of an impedance matched SPDT switch. All rectangular components in FIGS. 14a–b and 15 represent approximately quarter-wavelengths. In FIG. 14a the quarter-wavelengths serve to isolate the ports depending on the conducting state of diodes 1402 or 1404. With no current through the diode, a signal present at $RF_{in}$ does not propagate to either $RF_{outA}$ or $RF_{outB}$. Signal propagation is permitted to either output upon conduction of either diode.

The switch shown in FIG. 14b operates similarly to the switch in FIG. 14a. The quarter-wavelengths serve to isolate the ports depending on the conducting state of diodes 1406, 1408 or 1410. The switch in FIG. 14b has a resistor 1412 that serves to terminate the $RF_{in}$ port. As shown in this embodiment resistor 1412 terminates the $RF_{in}$ port at 50 Ohms.

Both devices pictured in FIGS. 14a and 14b are suitable for the SPTT application because the RF outputs may be simultaneously operated in the isolation state while maintaining impedance match at the RF input. In both circuit topologies, the switch is placed in a low-loss condition by a negative pulse that is applied at the bias terminal.

The circuit topology for an illustrative SPTT switch is provided in FIG. 15. With this circuit topology, a single output may be selected to maintain impedance match.

Embodiments of the invention further include methods for measuring range and bearing of an object. In an illustrative embodiment at least a portion of a first pulse is transmitted. The transmitted pulse reflected from an object is received. At least a portion of the first pulse is applied simultaneously to a Σ-mixer and a Δ-mixer. The received pulse is applied simultaneously to the Σ-mixer and the Δ-mixer. A first video pulse is generated from the Σ-mixer, and a second video pulse is generated from the Δ-mixer when the portion of the first pulse that was transmitted at least partially overlaps the reflected pulse. One or more of the following actions may then be performed, 1) measuring a video pulse amplitude difference between the first video pulse and the second video pulse, and determining the bearing angle based on the measured video pulse amplitude difference; 2) determining an object range based on the first video pulse output; and 3) measuring a video pulse phase difference between the first video pulse and the second video pulse, and determining whether the object is to the right or left of boresight based on the measured video pulse phase difference.

In a further embodiment of the invention a single transmit and receive antenna assembly is used. The preferred method associated with a single antenna assembly includes segmenting the first pulse described above. The first pulse is segmented into a first segment and a second segment. The first segment is the transmitted portion of the first pulse and the received pulse is the transmitted first segment reflected from an object. The second segment is the portion of the first pulse applied simultaneously to the Σ-mixer and the Δ-mixer.

The first pulse may be segmented by a switching assembly such as switching assembly 416 shown in FIG. 4.

Signal isolation in a first channel may be increased by providing a switching assembly through which the reflected pulse passes prior to being input to the Δ-mixer. An example of such a switching assembly is shown as part 422 in FIG. 4.

Optionally, the power of the transmitted signal may be amplified.

Advantageously, embodiments of the inventive architecture and methods of measurement may provide greater bearing resolution without the complexity of a switched-lobe antenna or the dwell time required for off-boresight data acquisition.

While the invention has been described by illustrative embodiments, additional advantages and modifications will occur to those skilled in the art. Therefore, the invention in its broader aspects is not limited to specific details shown and described herein. Modifications, for example, to the circuit components, pulse segmentation mechanism, switching assembly and antenna assembly, may be made without departing from the spirit and scope of the invention. Accordingly, it is intended that the invention not be limited to the specific illustrative embodiments, but be interpreted within the full spirit and scope of the appended claims and their equivalents.

What is claimed is:

1. A method of determining object location comprising:
   transmitting at least a portion of a first signal;
   receiving a reflected signal;
   applying at least a portion of the first signal to a first mixer and a second mixer;
   applying the received signal to the first mixer and the second mixer;
   generating a second signal from the first mixer, and a third signal from the second mixer when the portion of the first signal that was applied to the first and second mixers at least partially overlaps the reflected signal;
   performing one or more measurements based on one or more signals from the group consisting of the second signal, the third signal and a combination of the second and third signals; and,
   increasing signal isolation in a first channel by providing a switching assembly through which the reflected signal passes prior to being input to the second mixer.

2. The method of claim 1 wherein the first mixer is a Σ-mixer and the second mixer is a Δ-mixer.

3. The method of claim 1 wherein the first signal is applied simultaneously to the first mixer and the second mixer.

4. The method of claim 1 wherein the received signal is applied simultaneously to the first mixer and the second mixer.

5. The method of claim 1 wherein the one or more measurements are from the group consisting of determining the bearing angle, determining the object range and determining whether the object is to the left or right of boresight.

6. The method of claim 5 wherein the bearing angle determination is based on a measured signal amplitude difference between the second signal and the third signal.

7. The method of claim 5 wherein the object range determination is based on the second signal.

8. The method of claim 5 wherein the determination of whether the object is to the right or left of boresight is based on a measured signal phase difference between the second signal and the third signal.

9. The method of claim 1 wherein the signals are pulses.

10. The method of claim 1 wherein the second signal and third signal are video pulses.

11. The method of claim 1 wherein:
    the first signal is segmented into a first segment and a second segment the first segment is the transmitted portion of the first signal;
    the received pulse is the transmitted first segment reflected from an object; and
    the second segment is the portion of the first signal applied to the first mixer and the second mixer.

12. The method of claim 11 wherein the second segment is applied simultaneously to the first mixer and the second mixer.

13. The method of claim 11 wherein the first mixer is a Σ-mixer and the second mixer is a Δ-mixer.

14. The method of claim 11 further comprising:
    amplifying the first segment.

15. The method of claim 1 used in a sensor having separate transmit and receive antenna assemblies.

16. The method of claim 1 used in a sensor having a single transmit and receive antenna assembly.

17. The method of claim 1 wherein the first signal is a radio frequency signal.

18. The method of claim 1 further comprising:
    dynamically changing a width of the first signal to determine object range.

19. The method of claim 1 wherein measurements are not performed until a pulse length of the first signal is greater than a delay associated with the received signal.

20. A method of determining object location comprising:
    transmitting at least a portion of a first signal; receiving a reflected signal;
    applying at least a portion of the first signal to a first mixer and a second mixer;
    applying the received signal to the first mixer and the second mixer;
    generating a second signal from the first mixer, and a third signal from the second mixer when the portion of the first signal that was applied to the first and second mixers at least partially overlaps the reflected signal;
    performing one or more measurements based on one or more signals from the group consisting of the second signal, the third signal and a combination of the second and third signals,
    wherein the first signal is segmented into a first segment and a second segment the first segment is the transmitted portion of the first signal;
    wherein the received pulse is the transmitted first segment reflected from an object;
    wherein the second segment is the portion of the first signal applied to the first mixer and the second mixer; and,
    wherein the first signal is segmented by a switching assembly.

21. A method of measuring object range and bearing comprising:
    segmenting a radio frequency pulse into a first pulse segment and a second pulse segment;
    transmitting the first pulse segment;
    receiving the first pulse segment reflected from an object; applying the second pulse segment to a Σ-mixer and simultaneously to a Δ-mixer; applying the received first pulse segment to the Σ-mixer and simultaneously to the Δ-mixer;
    generating a Σ-video pulse from the Σ-mixer and a Δ-video pulse from the Δ-mixer when the received first pulse segment at least partially overlaps the second pulse segment; and performing one or more measurements from the group consisting of:

measuring a video pulse amplitude difference between the Σ-mixer video pulse and the Δ-mixer video pulse, and determining the bearing angle based on the measured video pulse amplitude difference;

determining an object range based on the Σ-mixer video pulse output; and measuring a video pulse phase difference between the Σ-mixer video pulse and the Δ-mixer video pulse, and determining whether the object is to the right or left of boresight based on the measured video pulse phase difference wherein the radio frequency pulse is segmented by a switching assembly.

22. The method of claim 21 further comprising:

increasing signal isolation in a Δ-channel by providing a second switching assembly through which the received first pulse segment passes prior to being input to the Δ-mixer.

23. The method of claim 21 further comprising:

dynamically changing a width of the first pulse to determine object range.

24. The method of claim 21 wherein measurements are not performed until a pulse length of the first pulse is greater than a delay associated with the received pulse.

25. The method of claim 21 used in a sensor having antennas operating with a hybrid junction.

26. A sensor for object range and bearing measurement comprising:

a first mixer to mix at least a portion of a first signal with a received signal;

a second mixer to mix at least a portion of the first signal with the received signal;

wherein the first mixer generates a second signal and the second mixer generates a third signal when the portion of the first signal that was applied to the first and second mixers at least partially overlaps the reflected signal; and wherein the sensor performs one or more measurements based on one or more signals from the group consisting of the second signal, the third signal and a combination of the second and third signals, further comprising:

a switching assembly;

wherein the switching assembly segments the first signal into a first segment and a second segment and causes the first segment to be transmitted from an antenna, and the second segment to be applied to the first mixer and the second mixer simultaneously.

27. The sensor of claim 26 wherein the switching assembly comprises one or more GaAs PIN switches.

28. The sensor of claim 26 further comprising:

a hybrid junction functionally connected to an antenna assembly;

wherein when the switching assembly is in a transmit position, the first segment is transmitted by the antenna assembly; and when the switching assembly is in a receive position, the antenna assembly receives the received signal; and the second segment and the received pulse are input to the first mixer and the second mixer.

29. A sensor for object range and bearing measurement comprising:

It first mixer to mix at least a portion of a first signal with a received signal;

a second mixer to mix at least a portion of the first signal with the received signal;

wherein the first mixer generates a second signal and the second mixer generates a third signal when the portion of the first signal that was applied to the first and second mixers at least partially overlaps the reflected signal; and wherein the sensor performs one or more measurements based on one or more signals from the group consisting of the second signal, the third signal and a combination of the second and third signals, further comprising a switching assembly between the second mixer and an antenna assembly to increase signal isolation.

30. The sensor of claim 29 configured so that the at least portion of the first signal is applied to the first mixer and the second mixer simultaneously.

31. The sensor of claim 29 configured so that the received signal is applied to the first mixer and the second mixer simultaneously.

32. The sensor of claim 29 wherein the first mixer is a Σ-mixer and the second mixer is a Δ-mixer.

33. The sensor of claim 29 further comprising:

a first preamp having an input port connected to an output port of the first mixer; and a second preamp having an input port connected to an output port of the second mixer.

34. The sensor of claim 29 further comprising:

a phase-shift element into which the first segment is input prior to being transmitted, to change the phase of transmitted signals.

35. The sensor of claim 29 wherein the sensor is configured to dynamically change a width of the first signal to determine object range.

36. The sensor of claim 29 wherein measurements are not performed until a pulse length of the first signal is greater than a delay associated with the received signal.

37. A method of determining object location comprising:

transmitting at least a portion of a first pulse;

receiving a reflected pulse;

applying at least a portion of the first pulse simultaneously to a Σ-mixer and a Δ-mixer; applying the received pulse simultaneously to the Σ-mixer and the Δ-mixer;

generating a first video pulse from the Σ-mixer, and a second video pulse from the Δ-mixer when the portion of the first pulse that was transmitted at least partially overlaps the reflected pulse;

performing one or more measurements from the group consisting of:

measuring a video pulse amplitude difference between the first video pulse and the second video pulse, and determining the bearing angle based on the measured video pulse amplitude difference;

determining an object range based on the first video pulse output; and measuring a video pulse phase difference between the first video pulse and the second video pulse, and determining whether the object is to the right or left of boresight based on the measured video pulse phase difference, wherein the first pulse is segmented into a first segment and a second segment;

wherein the first segment is the transmitted portion of the first pulse;

wherein the received pulse is the transmitted first segment reflected from an object;

wherein the second segment is the portion of the first pulse applied simultaneously to the Σ-mixer and the Δ-mixer; and, wherein the first pulse is segmented by a switching assembly.

38. A method of determining object location comprising:

transmitting at least a portion of a first pulse;

receiving a reflected pulse;

applying at least a portion of the first pulse simultaneously to a Σ-mixer and a Δ-mixer; applying the received pulse simultaneously to the Σ-mixer and the Δ-mixer;

generating a first video pulse from the Σ-mixer, and a second video pulse from the Δ-mixer when the portion of the first pulse that was transmitted at least partially overlaps the reflected pulse;

performing one or more measurements from the group consisting of:

measuring a video pulse amplitude difference between the first video pulse and the second video pulse, and determining the bearing angle based on the measured video pulse amplitude difference;

determining an object range based on the first video pulse output; and measuring a video pulse phase difference between the first video pulse and the second video pulse, and determining whether the object is to the right or left of boresight based on the measured video pulse phase difference, further comprising:

increasing signal isolation in a first channel by providing a switching assembly through which the reflected pulse passes prior to being input to the Δ-mixer.

39. The method of claim 38 wherein:

the first pulse is segmented into a first segment and a second segment the first segment is the transmitted portion of the first pulse;

the received pulse is the transmitted first segment reflected from an object; and the second segment is the portion of the first pulse applied simultaneously to the Σ-mixer and the Δ-mixer.

40. The method of claim 39 further comprising: amplifying the first segment.

41. The method of claim 38 used in a sensor having separate transmit and receive antenna assemblies.

42. The method of claim 38 used in a sensor having a single transmit and receive antenna assembly.

43. The method of claim 38 further comprising:

dynamically changing a width of the first pulse to determine object range.

44. The method of claim 38 wherein measurements are not performed until a pulse length of the first pulse is greater than a delay associated with the received pulse.

* * * * *